United States Patent
Sriram et al.

(10) Patent No.: US 7,280,585 B2
(45) Date of Patent: Oct. 9, 2007

(54) PARALLEL INTERFERENCE CANCELLATION DEVICE FOR MULTI-USER CDMA SYSTEMS

(75) Inventors: Sundararajan Sriram, Plano, TX (US); Alan Gatherer, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 800 days.

(21) Appl. No.: 10/364,087

(22) Filed: Feb. 11, 2003

(65) Prior Publication Data
US 2003/0156630 A1   Aug. 21, 2003

Related U.S. Application Data

(60) Provisional application No. 60/355,884, filed on Feb. 11, 2002.

(51) Int. Cl.
*H04B 1/00* (2006.01)

(52) U.S. Cl. .................................. 375/148

(58) Field of Classification Search ............ 375/140, 375/148, 285, 346, 348, 349, 147, 130, 316, 375/259; 370/320, 335, 342, 319, 316, 315, 370/310, 329, 328
See application file for complete search history.

(56) References Cited

U.S. PATENT DOCUMENTS

| | | | | |
|---|---|---|---|---|
| 6,192,067 B1* | 2/2001 | Toda et al. | .................. | 375/144 |
| 6,600,729 B1* | 7/2003 | Suzuki | ...................... | 370/335 |
| 2002/0051433 A1* | 5/2002 | Affes et al. | .................. | 370/335 |

\* cited by examiner

*Primary Examiner*—Pankaj Kumar
(74) *Attorney, Agent, or Firm*—Robert D. Marshall, Jr.; W. James Brady, III; Frederick J. Telecky, Jr.

(57) ABSTRACT

This invention provide parallel interference cancellation for wireless communication base stations. Received user inputs symbols are spread by means of pseudo-noise sequences to form user input chip vectors. These are added together and interpreted to form chip vectors of interference samples. These chip vectores are despread to form interference output symbols by pseudo-noise sequences. The interference output signals are subtracted from the received user input symbols to obtain a first estimate of transmitted symbols. This process may be continued for two or more iterations to obtain better interference cancellation.

8 Claims, 4 Drawing Sheets

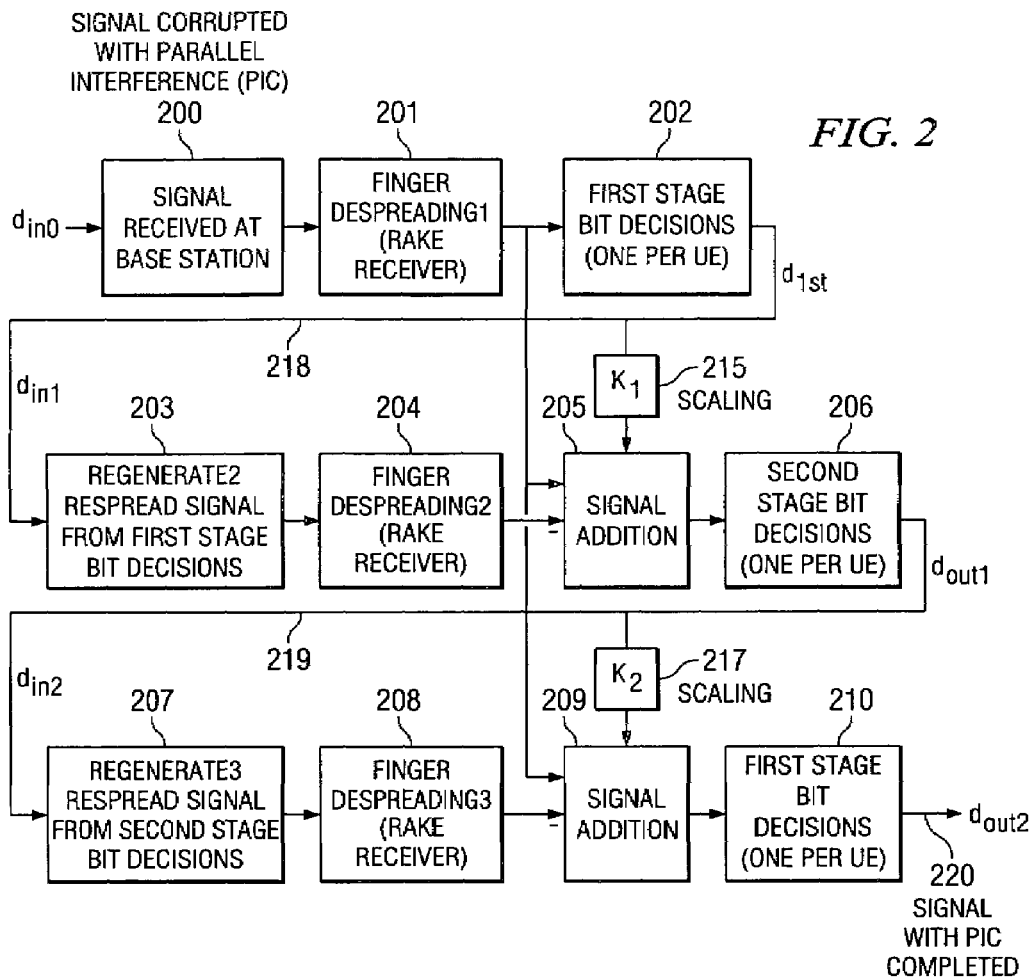
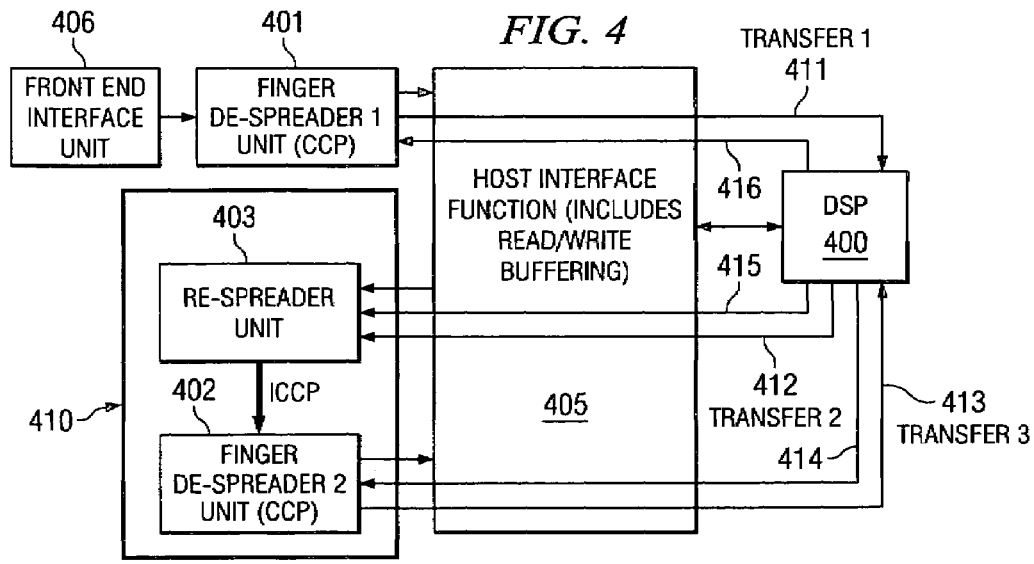

US 7,280,585 B2

PARALLEL INTERFERENCE CANCELLATION DEVICE FOR MULTI-USER CDMA SYSTEMS

CLAIM OF PRIORITY

This application claim priority under 35 U.S.C. 119(e)(1) from U.S. Provisional Application No. 60/355,884 filed Feb. 11, 2002.

TECHNICAL FIELD OF THE INVENTION

The technical field of this invention is interference cancellation in wireless telephone systems.

BACKGROUND OF THE INVENTION

Digital signal processing (DSP) tasks almost universally include processing that reduces or eliminates noise and interference. While the character of the noise and interference varies widely with the application, the principles for dealing with it involve firstly, the analysis of the properties of the noise or interference and secondly, the development of algorithmic approaches to extract the highest quality form of the desired signal from the offending aspects environment.

In digital signal processing an enormous amount of technical effort has been brought to bear on the most pressing issues resulting in a wide range of techniques. Parallel interference cancellation (PIC) is one class of such techniques and it involves mathematical operations that can be reduced to a pipeline of cascaded matrix operations on the raw vector signal. The raw vector signal is a composite of signal, noise and interference. When interference predominates, the nature of the interference and its mathematical properties are of paramount importance.

Interference is often periodic or highly repetitious. This is clear in the realm of cellular communications. Interference often has predictable characteristics even when a-periodic and irregular in time.

In cellular communications using code division multiple access transmissions (CDMA), one example of a closed system may be assumed to be an array of perhaps eight pairs of user equipment (UE) communicating within a cell. The signal emanating from each sending user equipment may take several paths in traversing its primary path to the base station. These paths may represent reflections from interfering physical objects. The received signals at the base station have then a significant amount of parallel interference. This interference must be eliminated to reconstruct a clear replica of the transmitted signal for passage to the receiving user equipment.

The task of the base station includes determining the signal processing parameters to accomplish this parallel interference cancellation. These processing parameters take the form of a matrix of parameters describing the composite effects of the environment on known signals transmitted between the eight user pairs. The existence of pre-determined parameters stored in the base station is crucial to the development of effective interference cancellation techniques. Most prevalent among the values used in cancellation calculations are the pseudo-noise parameters and the finger spreading parameters.

Origins of Bits, Symbols and Chips

Bits of user data to be transmitted are coded in symbols. In binary phase shift keying (BPSK), a single bit is coded by a one-bit code. Among the more complex coding schemes is quadrature phase shift keying (QPSK), which is defined by a constellation diagram and could prescribe two bits to form the symbol. Pseudo-noise parameters describe the conversion of the constellation-based symbol coding into a sequence of chips, for example 64 chips per symbol. This spreading into chips provides a vehicle to employ techniques necessary for spread spectrum communication processing. Chips are the actual unit of data communication through the interfering environment. As such the chip transmission rate is limited by allocated bandwidth and guard-banding considerations. Thus an actual data bit is transmitted by spreading factor (SF) chips. In a given environment having multipath signal reflection effects these chips undergo multipath spreading.

For cellular communications in particular, one highly developed technique for reduction of the effects of interference is the parallel interference cancellation (PIC) algorithm for CDMA based cellular receivers. Implementation of the parallel interference cancellation algorithm may take many forms. The key in development of an effective implementation lies in efficient use of standard digital signal processor operations augmented through special processing features. A wide variety of digital signal processors already exist. Cost effective solutions to parallel interference cancellation can be achieved most efficiently by (1) choosing the best adaptable basic processor and then (2) adding the augmented processing to arrive at a special processor solution that involve minimal changes from the standard processor base.

Consider a transmission of eight users to a given base station. Assume the base station determines that the transmission of each user through an. environment E will undergo multiple paths resulting in four paths of signal information. The initial bit oriented data to be transmitted is designated by an 8 by 1 matrix $[T_{bit}]$. [M] is a block diagonal matrix of size 32 by 8 whose blocks on the diagonal are column vector estimates of the effect of the channel for each user. The vector estimates of [M] are illustrated graphically the vertical lines in 107 of FIG. 1. These vectors are channel estimates of each multi-path component. In this example the transmission of a user includes four paths and the column vectors (vertical lines in 107) are 4 by 1 with each element being the effect of the channel (essentially a complex attenuation) on each path.

Consider the spreading matrix [S], having the form 109 illustrated in FIG. 1. The vector $[ER_{Code}]$ that represents the base stations estimate of the received signal without noise is given by:

$$[ER_{Code}] = [S] \times [M] \times [T_{bit}] \qquad (1)$$

This assumes that the modulation is binary phase shift keying (BPSK) so that the sign of the detected symbol indicates the bit value. A similar expression can be written for other modulation formats.

Parallel interference cancellation begins by performing standard demodulation on the actual received vector $AR_{Code}$ to derive a first estimate $[T_{est}]$ of the received signal. This involves multiplication by the transpose matrix $[S]^T$, whose rows are the spreading codes and then multiplication by $[M]^*$, the complex conjugate matrix of channel estimates. This is expressed as:

$$[T_{est}] = [M]^* \times [S]^T \times [AR_{code}] \qquad (2)$$

The form of matrix $[S]^T$ is illustrated at 110 of FIG. 1. The matrix $[M]^*$ illustrated at 104 is the complex conjugate matrix of 107 of FIG. 1. Multiplying by $[M]^*$ takes each finger and multiplies it by the conjugate of its channel estimate. This takes all the fingers associated with one user and adds them together. The vector $[T_{est}]$ is a bit-oriented column vector of length 8 having the same sign as that of $[T_{Bit}]$ but whose magnitude is related to the energy received. Thus a decision is made on the value of each bit by examining the signs. For despreading not involving interference cancellation the computation of equation (2) concludes the demodulation procedure. For despreading involving parallel interference cancellation, a set of two additional iterations is typically used to improve the estimate.

The preliminary stages of parallel interference cancellation are conceptually similar to the following process. For each user n, a preliminary value of the received signal $[RT_{code}]$ is computed by subtracting the interference term $[N]_n$ from the received data $[\rho]$ at each stage:

$$[RT_{code}] = [\rho] - [N]_n \quad (3)$$

where $[N]_n$ is the interference seen by user n. If the data sent due to user n is $v_n$, then:

$$[A] = \sum_i v_i \quad (4)$$

is the complete signal seen from all users (without noise) and the interference due to other users seen by user n is:

$$[N]_n = \sum_{i \neq n} v_i = [A] - v_n \quad (5)$$

Stated another way, every signal that is not due to user n is interference to user n.

After subtraction of the interference, despreading and decision making occur as in regular despread. For the next stage, the term $v_n$ is generated using the bit estimates from the previous stage.

Interference cancellation is based on the concept that after the first despread a small number of the bits will be incorrectly decoded but the overwhelming majority will be correctly decoded. For each correctly decoded bit, the interference due to that bit can be removed. If the bit is incorrectly decoded then interference cancellation will not remove interference but will actually add to it. If, as we have noted, most of the bits are correct, then the total interference decreases and the signal sent to the next stage is incrementally more free of interference than that sent to the previous stage. This means that more bits will be decoded correctly in the next stage. Hence, repeated stages tend to make the error rate decrease. In practice only two iterations are enough for this algorithm to converge to a desired result.

SUMMARY OF THE INVENTION

This invention efficiently implements, in device form, the parallel interference cancellation (parallel interference cancellation) algorithm for Code Division Multiple Access (CDMA) based cellular receivers. When used in a CDMA base station, the device of this invention device allows the capacity of the system to be greatly enhanced. This invention is able to apply the parallel interference cancellation algorithm to a large number of users while consuming relatively small silicon area.

The parallel interference cancellation problem is efficiently solved in this invention using an interference cancellation co-processor (ICCP), which operates on vectors of CDMA chips in parallel. This could be many as 64 chips at a time. All interfering user signals are spread by their respective pseudo-noise (PN) sequences, added together and interpolated to form a resulting vector of interference samples. This vector of samples is then passed into a correlator co-processor for despreading with the user PN sequence. The resulting despread symbol is an estimate of the interference and this may be subtracted from the original signal to obtain a better estimate of the transmitted symbol. The process of this invention is iterative which results in further improvement of signal to interference ratio for each applied iteration. The interference cancellation co-processor enables an approach where the interference signal is generated at the chip rate but canceled at the symbol rate.

BRIEF DESCRIPTION OF THE DRAWINGS

These and other aspects of this invention are illustrated in the drawings, in which:

FIG. 2 illustrates the flow diagram solution for a highly flexible integrated circuit implementation of the parallel interference cancellation algorithm;

FIG. 4 illustrates a code division multiple access transmission (CDMA) receiver block diagram for implementing the parallel interference cancellation algorithm;

DETAILED DESCRIPTION OF PREFERRED EMBODIMENTS

The interference cancellation co-processor (ICCP) of this invention is a task-based processor designed to work with digital signal processors (DSP) and co-processors for implementing the parallel interference cancellation (PIC) algorithm. Signal processing relevant to the basic parallel interference cancellation operation for each stage in an iterative process is described by the matrix expressions 101 through 108 illustrated in FIG. 1.

The parallel interference cancellation problem is efficiently solved by the interference cancellation co-processor, which operates on vectors of CDMA chips in parallel, for example 64 chips at a time. All interfering user signals are spread by their respective pseudo-noise (PN) sequences, added together and interpolated to form a resulting vector of interference samples. This vector of samples is then passed into a correlator co-processor for despreading with the user pseudo-noise sequence. The resulting despread symbol is an estimate of the interference and this may be subtracted from the original signal to obtain a better estimate of the transmitted symbol. The interference cancellation co-processor enables an approach where the interference signal is generated at the chip rate but canceled at the symbol rate. Only timing offsets, symbol decisions and channel estimates for each user are needed. Symbols from individual fingers are not needed. This eases communication between devices supporting different sets of users.

Symbolically the iterative parallel interference cancellation process involves the computation:

$$[d_{out}] = [d_{1st}] + [d_{inp}] - ([M]^* \times [S]^T \times [S] \times [M] \times [d_{inc}]) \quad (6)$$

where: $[d_{out}]$ is the decision variable of a given iteration; $[d_{1st}]$ is the decision variable after the first stage; and $[d_{inc}]$ is the estimate of the received data from the previous parallel interference cancellation iteration.

The quantity $[d_{inp}]$ is essentially $[d_{inc}]$ scaled to account for the effects of channel gain due to multiplication by $[M]$ and any scaling that might be introduced in the spreading/dispreading process.

Figure 1:
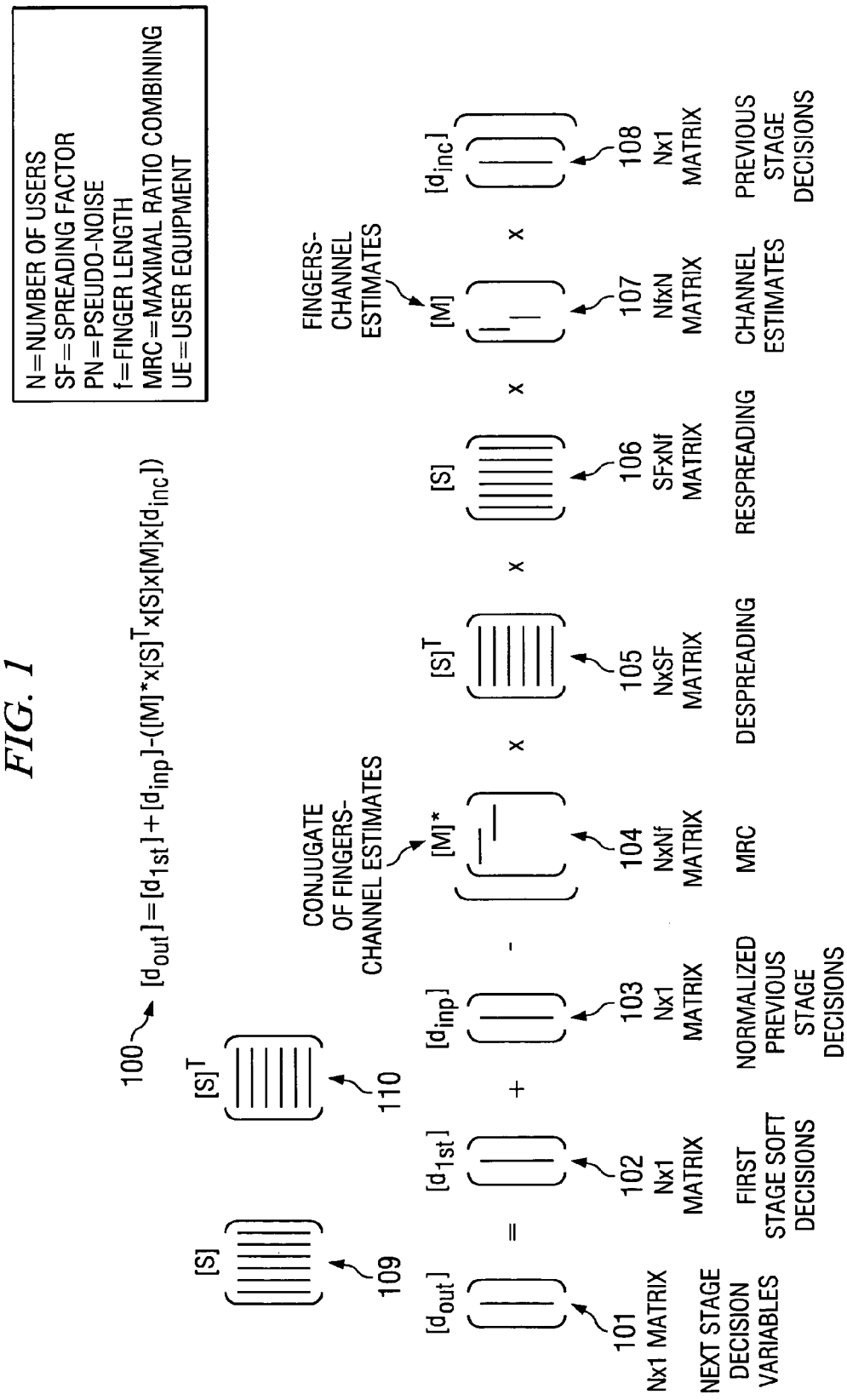
FIG. 1 illustrates in matrix form the operations performed in each stage of the parallel interference cancellation (PIC) algorithm.

The algorithm 100 of FIG. 1 is meant for use in an iterative calculation the basic description of operations on the current bit-oriented input signal $[d_{inc}]$. The quantity $[d_{inc}]$ is first re-spread by multiplication by matrix $[S]$ 106.

De-spreading is accomplished by multiplication by matrices $[S]^T$ 105 and $[M]^*$ 104. Jointly, these two operations 105 and 104 are implemented in a rake receiver that is described later in the text. Note that if we define the product matrix as:

$$[W] = [M]^* \times [S]^T \times [S] \times [M] \times [d_{inc}] \quad (7)$$

then $[W]$ is subtracted from the previous iteration of the data input signal $[d_{inp}]$ 103 and then added to the first iteration of the bit oriented data signal $[d_{1st}]$ 102 to form the resultant output data signal $[d_{out}]$ 101.

Matrices 101 through 108 in FIG. 1 are included to illustrate the form and structure (rows, columns and fingers) of the matrix transformations included in each step of the signal transformation. At each stage of an iterative calculation a current matrix of signal decisions is completed. In a cellular transmission from a user equipment to a base station the input signal vector, matrix $[d_{inc}]$ 108 is changed by the environment in a known fashion. The first operation, multiplication by matrix $[M]$ 107 expresses the occurrence of finger signals traversing in parallel interfering paths and being combined with the desired signals. The second component matrix $[S]$ 106 is the re-spreading matrix that adds the effects of pseudo-noise being added to the desired signal. The third component transformation may be viewed as accomplished through multiplication by matrices $[M]^*$ 104 and $[S]^T$ 105 in tandem, expresses despreading using the well-known technique of maximal ratio combining (MRC) to account for weighted effects of de-spreading on the finger components of the composite signal. Finally, the product of matrices 104 through 108 is subtracted from the previous stage iteration $[d_{inp}]$ 103 of the data signal and then added to the first stage iteration of the data signal $[d_{1st}]$ 102 to form the current or final data output signal $[d_{out}]$ 101.

FIG. 2 illustrates the flow diagram of the multi-iteration parallel interference cancellation processor implementation of this invention. Note that in the flow diagram of FIG. 2, the initial stage 200 involves reception of the corrupted signal $d_{in0}$ at the base station followed by the finger despreading stage 201 and the determination of first stage bit decisions 202.

This is expressed by the matrix equation:

$$[d_{1st}] = [M]^* \times [S]^T \times [d_{in0}] \quad (8)$$

The matrix equation:

$$[d_{out1}] = [d_{1st}] + [d_{inp1}] - ([M]^* \times [S]^T \times [S] \times [M] \times [d_{in1}]) \quad (9)$$

is a first iteration on the first estimate such as performed in computation elements 203 and 204. The bottom row of the flow diagram of FIG. 2 illustrates an additional second iteration of the parallel interference cancellation computation. Block 207 involves the respreading of $[d_{in2}]$ matrix $[S]$. Block 208 involves the despreading matrix $[S]^T$ and the $[M]^*$ operation. Blocks 215 and 219 scale previous estimates to account for increased gain effects in the respreading process. Blocks 205 and 209 complete the additions and subtractions required to complete respective stages of iterations of bit decisions on the data signal $[d_{out1}]$ as described in equation (7). Blocks 206 and 210 complete the decisions for the respective second and final iterations. The iteration of the bottom row of FIG. 2 could be repeated introducing another iteration. However, typically the parallel interference cancellation algorithm converges to a satisfactory result in only two iterations.

Figure 3:
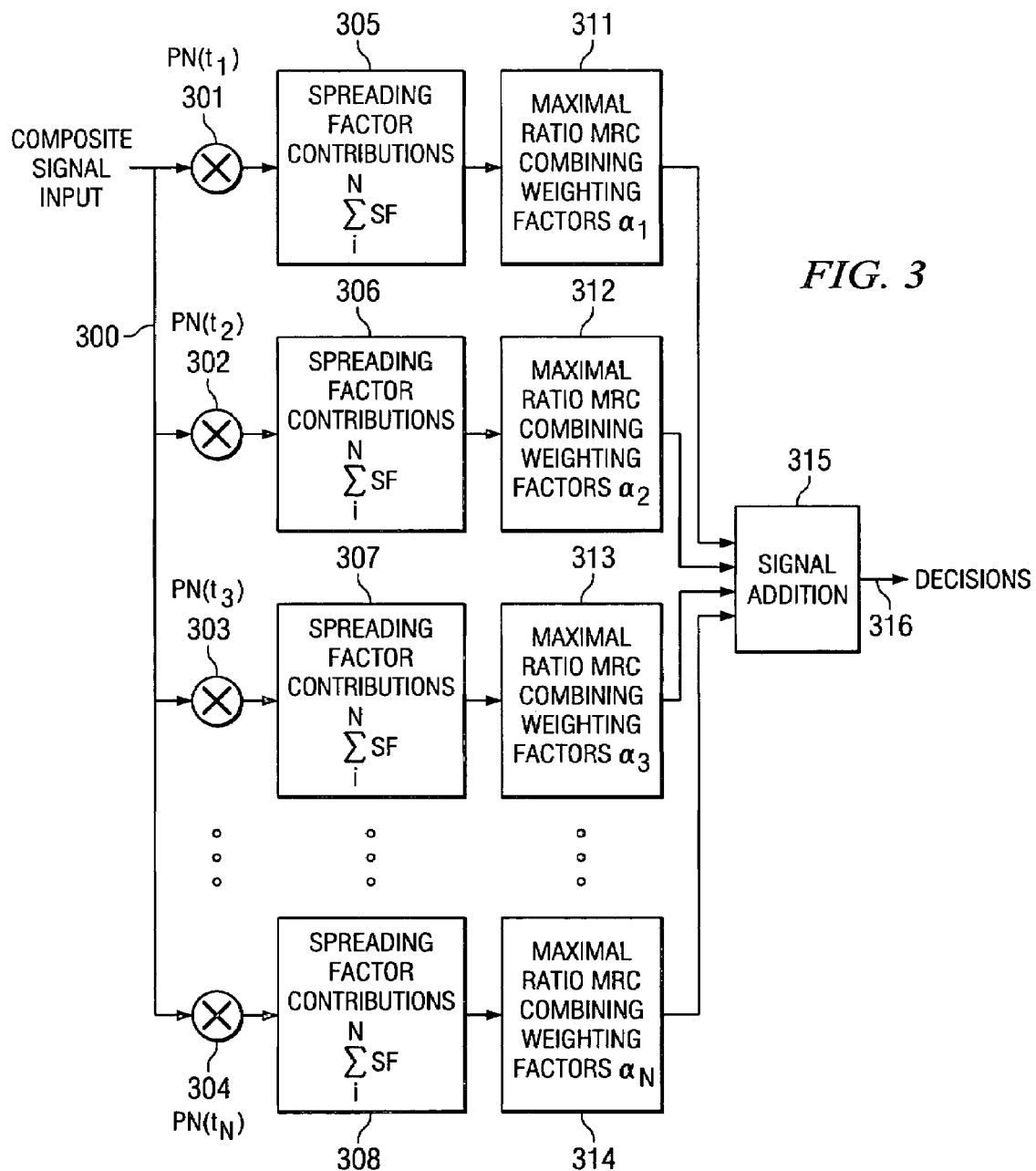
FIG. 3 illustrates the rake receiver which forms a part of the parallel interference cancellation hardware implementation of this invention.

FIG. 3. illustrates the elements of a rake receiver, described in U.S. patent application Ser. No. 09/461,063 entitled "WIRELESS BASE STATION SYSTEMS FOR PACKET COMMUNICATIONS" filed Dec. 14, 1999. now U.S. Pat. No. 6,574,213. The rake receiver accomplishes the $[M] \times H[S]^T$ operations (104 and 105 respectively of FIG. 1) in the multiple stage parallel paths of FIG. 3. Blocks 301 through 304 provide for pseudo-noise (PN) parameters to be included prior to accounting for the despreading with spreading factors (SF). Cascading blocks 301 and 305, for example, completes the operation described by matrix $[S]^T$ for the first finger. Block 311 completes the operation described by the matrix $[M]^*$ for the first finger. Thus blocks 305 through 308 illustrate the de-spreading computations for each of the four fingers and blocks 311 through 314 provide for the weighting factors $\alpha_i$ to be included according to the prescription of maximal ratio combining (MRC) for each of the four fingers. Maximal ratio combining involves the product of the weighting factor $\alpha_i$ of each finger times the complex conjugate of the channel estimates for that finger. The resultant overall signal 316 is computed in summation block 315.

FIG. 4 illustrates the heart of the invention, the implementation of the CDMA receiver. The interference cancellation co-processor (ICCP) is included in box 410. The data transfers indicated in FIG. 4 are as follows.

Transfer 1

Transfer 1 labeled 411 transfers results of the first despread operation in block 401 performed on symbols from each rake finger, pilot symbols and correlation results for time tracking to digital signal processor 400. This first despread operation corresponds to block 201 of the flow diagram of FIG. 2. Digital signal processor 400 uses these results to form channel estimates, and typically performs maximal ratio combining (MRC) on the finger symbols to form an initial set of decisions on user symbols. Forming these decisions corresponds to block 202 of the flow diagram of FIG. 2.

For interference cancellation, digital signal processor 400 groups users into sets for group-wise interference cancellation. Digital signal processor 400 also forms decisions for each stage of the parallel interference cancellation algorithm. The decisions can be hardware or software decisions and various algorithms for decision computation may be used. Hardware calculations of maximal ratio combining (MRC) effects are carried out in the finger despreader units 401 or 402. Alternately software calculations of maximal ratio combining (MRC) effects are accomplished by programming digital signal processor 400 to drive them.

Host interface function 405 provides read/write buffer hardware and interface to the DMA function of digital signal processor 400. Digital signal processor 400 configures despreader1 401 as necessary via path 416.

Transfer 2

For the set of users on which group-wise interference cancellation is to be performed, digital signal processor 400 sends to the respreader 403 in Transfer 2 labeled 412, the finger parameters such as pseudo-noise code (PN), timing, channel estimates and decisions from the previous parallel interference cancellation stage. Block 403 performs the operations previously identified in FIG. 2 block 203 for the first iteration and in block 207 for the second iteration. Digital signal processor 400 also configures the finger despreader2 unit 402 via path 414 to perform the despreading operation. Finger despreader2 402 processes up to 64 chips in a single iteration. Digital signal processor 400 configures respreader 403 as necessary via path 415.

Transfer 3

In Transfer 3 labeled 413, the finger despreader2 unit 402 operates on the interference signal generated by the respreader unit 403 to produce finger symbols for the next parallel interference cancellation stage. These finger symbols are then transferred to digital signal processor 400 via the host interface function 405. Note that the finger despreader2 (FD2) 401 and respreader unit 403 could be processing multiple parallel interference cancellation stages in parallel in data-pipelined fashion. This is explained further in FIG. 6.

Note that the finger symbols produced by finger despreader2 402 are estimates of the interference signal. These estimates are used to cancel the interference at the symbol rate on digital signal processor 400. Interference may be cancelled after the interference symbols have been combined (using MRC for example). This approach has three main advantages.

1. It requires less storage of finger symbols.

2. It allows transfer of lesser amount of data between circuits processing different sets of users.

3. It requires less bandwidth between the interference cancellation co-processor and the digital signal processor.

Respreader Function

Figure 5:
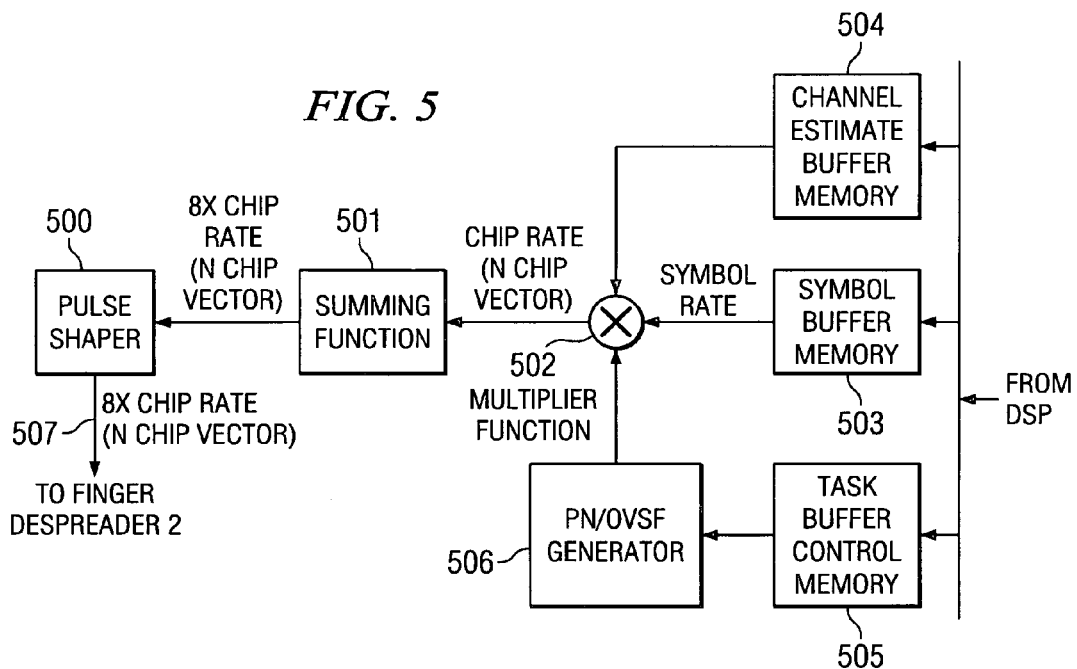
FIG. 5 illustrates the block diagram of the re-spreader function of this invention.

The respreader unit 403 of FIG. 4 is illustrated in the functional block diagram of FIG. 5. The respreader unit computes results from a combination of data that was derived from pilot signals, which are known codes, transmitted from each user equipment to the base station. Primarily these are previous estimates of the received signal and these are expressed in terms of computed symbol values stored in buffer 503 and channel estimates stored in buffer 504. Digital signal processor 400 also controls the operations required by way of task buffer control memory 505. The PN/OVSF generator 506 provides the pseudo random noise values (PN) and the orthogonal variable spreading factor information (OVSF). These parameters are involved in preliminary multiplication in the multiplier element 502. These individual product terms calculated to form the respread matrix [S]×[M] are generated by multiplier 502 and then summed as required in summing function 501.

The pulse shaper block 500 performs high-resolution interpretation of summing function results at 8 times the chip rate prior to passing the output results to finger despreader2 402 via path 507. Data collected by digital signal processor 400 in the receiver sampling process preserves this high degree of resolution.

Figure 6:
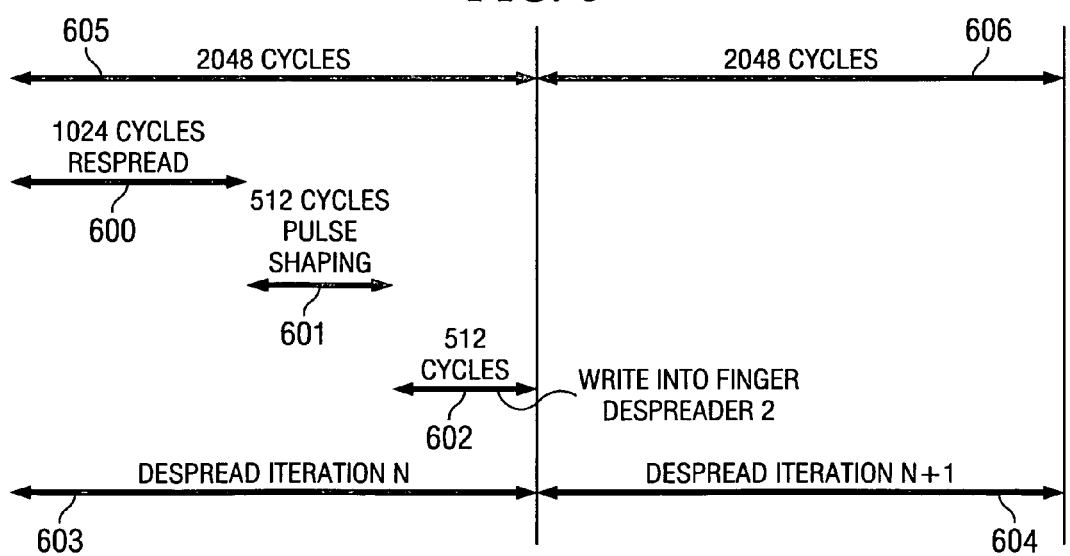
FIG. 6 illustrates the parallel interference cancellation (PIC) pipeline characteristics.

The interference cancellation co-processor pipeline for an embodiment of this invention with the interference cancellation co-processor operating at 32 times the chip rate is illustrated in FIG. 6.

The respread operation 600 works on blocks of 64 CDMA chips. It respreads the signals from all the specified user equipments, using the bit decisions written into the symbol buffer memory (503 of FIG. 5). For each finger of each user equipment the respreader multiplies each of the bit decisions by the channel estimate for that bit, stored in channel estimates buffer memory (504 of FIG. 5).

The respreader also produces the spreading code for each user equipment and multiplies the product of the bit and the channel estimate by this code. In this process the bits are up-sampled by the spreading factor used by each user equipment. The resultant spread data is now at chip rate and represents the signal for one finger of one user equipment. Since the desired timing granularity is typically 4 times or 8 times the chip rate, the signal must be interpolated and root raised cosine filtered. In order to do this, the signal from each finger is added into one out of eight phases (assuming 8 times over-sampling), depending on the timing phase used by that finger.

The spread signals of all fingers of all user equipments are added together into eight phases. The respreader spreads enough bits from each user equipment such that 64 chips worth of re-created chip-rate interference is produced, at the over-sampled rate (8 times in this example). The over-sampled spread signal is then passed through a Root Raised Cosine filter implemented as part of the pulse shaping block 500 of FIG. 5 to produce the final interference signal.

Since multiple iterations of parallel interference cancellation are processed in a pipelined manner, the respreader may be operated at a higher throughput in order process multiple parallel interference cancellation iterations within a 64-chip time interval. In the exemplary embodiment the respreader processes two iterations of the parallel interference cancellation for 64 user equipment and 3 fingers/user equipment in parallel.

Pulse shaping 601 and finger despreader2 write cycles 602 are completed during the time interval of the second half of the despread N iteration labeled 603.

For despread operations 603 and 604 the correlator coprocessor has the capacity of performing 2048 correlating fingers simultaneously. This allows the CCP to despread 64 user equipment, 8 fingers/user equipment and perform 2 iterative stages of parallel interference cancellation.

Possible Architecture Variations

1. Include maximal ratio combining (MRC) in interference cancellation co-processor hardware to reduce interference cancellation co-processor to digital signal processor bandwidth.

2. Merge of some functions between the finger despreader block 402 and the respreader block 403. For example, the PN/OSVF generator 506 and elements of the data-path control may be combined.

The interference cancellation co-processor is novel in the following ways. This invention includes a highly parallel data-path allowing processing of a large number of users and paths per user, using relatively little silicon chip area. This invention includes unique partitioning between hardware and digital signal processor software allowing great flexibility in the algorithms that can be implemented using the interference cancellation co-processor. This invention enables parallel interference cancellation algorithm variants implemented in the interference cancellation co-processor requiring only combined symbol data, since the interference signal is both computed and cancelled after finger combining. This implies: lesser required storage because the symbol memories are smaller by a factor equal to the number of multi-paths; lesser communication between digital signal processors handling different sets of users; lesser computation requirements; and lesser required bandwidth between the interference cancellation co-processor and the digital signal processor.

In summary, the solution of this invention provides firstly, through vector processing, the capability to handle a large number of users at the base station (for example, perhaps 64 voice rate users), using relatively little silicon chip area. Secondly, by subtracting the interference after finger combining is done, less data needs to be stored and transferred between the digital signal processor. Thirdly, with flexible hardware/software partitioning the solution allows for a number of algorithmic variants such as symbol decision computation, number of cancellation stages, different channel estimation techniques, group-wise interference cancellation and other processing variations as well.

What is claimed is:

1. A method for cancellation of interference in wireless communication comprising the steps of:
spreading received user input symbols by means of pseudo-noise sequences to form user input chip vectors;
adding together and interpreting said user input chip vectors to form chip vectors of interference samples;
despreading said chip vectors of interference samples to form interference output symbols by means of said pseudo-noise sequences;
subtracting said interference output symbols from said received user input symbols to obtain a first estimate of transmitted symbols;
respreading the first estimate of the transmitted symbol;
thereafter despreading the output resulting in a second sample of chip vectors of interference; and
subtracting said second sample of chip vectors of interference from the first estimate of transmitted symbol to form a second estimate of transmitted symbols.

2. The method of claim 1 further comprising the steps of:
respreading the second estimate of the transmitted symbol;
thereafter despreading the output resulting in a third sample of chip vectors of interference; and
subtracting said third sample of chip vectors of interference from the second estimate of transmitted symbol to form a third estimate of transmitted symbols.

3. A wireless CDMA base station apparatus comprising:
a radio frequency receiver collecting and processing input radio frequency signals and converting them into digital signal serial streams of chip vectors;
a first despreader unit receiving the chip vectors from said radio frequency receiver to obtain a first estimate of input symbol vectors;
a respreader unit receiving the input intermediate chip vectors and respreading said input intermediate symbol vectors;
a second despreader unit receiving respread intermediate symbol vectors from said respreader and dispreading the respread intermediate symbol vectors; and
a digital signal processor coupled to said first despreader unit, said second despreader unit and said respreader unit, the digital signal processor programmed to:
receive the input symbol vectors from said first despreader unit and form digital signal serial streams and form first stage symbol decisions from output of the first despreader unit;
supply said first stage symbol decisions to said respreader unit;
receive output of said second despreader and form next stage symbol decisions; and
group sets of users for processing in manner consistent with group-wise parallel interference cancellation algorithm.

4. Apparatus of claim 3 wherein:
said digital signal processor is connected to said interference cancellation co-processor to set parameters for said respreader unit.

5. Apparatus of claim 3 wherein:
said digital signal processor is connected to said interference cancellation co-processor to control plural sets of the respreader and second despreader units.

6. A wireless CDMA base station apparatus comprising:
a radio frequency receiver collecting and processing input radio frequency signals and converting them into digital signal serial streams of chip vectors;
a first despreader unit receiving the chip vectors from said radio frequency receiver to obtain a first estimate of input symbol vectors;
a respreader unit receiving the input intermediate chip vectors and respreading said input intermediate symbol vectors;
a second despreader unit receiving respread intermediate symbol vectors from said respreader and dispreading the respread intermediate symbol vectors; and
a digital signal processor coupled to said first despreader unit, said second despreader unit and said respreader unit, the digital signal processor programmed to:
receive the input symbol vectors from said first despreader unit and form digital signal serial streams and form first stage symbol decisions from output of the first despreader unit;
supply said first stage symbol decisions to said respreader unit;
receive output of said second despreader and form next stage symbol decisions; and
control plural iterations within the respreader unit and the second despreader unit.

7. Apparatus of claim 6 wherein:
said digital signal processor is connected to said interference cancellation co-processor to set parameters for said respreader unit.

8. Apparatus of claim 6 wherein:
said digital signal processor is connected to said interference cancellation co-processor to control plural sets of the respreader and second despreader units.

* * * * *